United States Patent [19]

Naya

[11] Patent Number: 5,811,811
[45] Date of Patent: Sep. 22, 1998

[54] ENVIRONMENT MONITOR

[75] Inventor: Kazunari Naya, Toda, Japan

[73] Assignee: Japan Energy Corporation, Tokyo, Japan

[21] Appl. No.: 765,407

[22] PCT Filed: May 7, 1996

[86] PCT No.: PCT/JP96/01208

§ 371 Date: Jan. 8, 1997

§ 102(e) Date: Jan. 8, 1997

[87] PCT Pub. No.: WO96/35930

PCT Pub. Date: Nov. 14, 1996

[30] Foreign Application Priority Data

May 8, 1995 [JP] Japan ................................. 7-109793

[51] Int. Cl.$^6$ ................................................. G01J 5/62
[52] U.S. Cl. ............................ 250/339.15; 250/339.02; 250/339.04; 250/351
[58] Field of Search ............... 250/339.15, 339.14, 250/339.04, 339.02, 351

[56] References Cited

U.S. PATENT DOCUMENTS

| | | | |
|---|---|---|---|
| 3,641,345 | 2/1972 | Coackley et al. | 250/347 |
| 3,926,527 | 12/1975 | Pembrook et al. | 356/246 |
| 4,043,742 | 8/1977 | Egan et al. | 431/12 |
| 4,693,615 | 9/1987 | Kyriakis | 374/129 |
| 5,153,563 | 10/1992 | Goto et al. | 340/578 |

FOREIGN PATENT DOCUMENTS

4-299797  10/1992  Japan .

Primary Examiner—Constantine Hannaher
Attorney, Agent, or Firm—Birch, Stewart, Kolasch & Birch, LLP

[57] ABSTRACT

A disc having a plurality of slits radially each of which have approximately the same width as a diameter of a photoreceptor of the sensor, and a rotary chopper, are arranged to coaxially rotate. When one of the slits faces a sensor, the disc and the chopper are rotated at a rotational speed so that the incident infrared radiation into the sensor is chopped 2–16 times by the chopper. At least two sets of sensors, each set of which comprises a plurality of sensors for sensing infrared radiation of different wavelength bands to one another, the sensors being arranged behind the chopper and the disc along a radial direction centered at the rotational axis of the chopper, are provided. Accordingly, because detection signals by scanning a monitored area in a X-direction and a Y-direction respectively are obtained, it is possible to easily recognize the position where the disastrous fire occurs in the visual field and to detect positions of disastrous fires in distinction from one another even if those occur at a plurality of positions.

10 Claims, 9 Drawing Sheets

HEAT DISTRIBUTION

FIG.6 a HORIZONTAL SCANNING

FIG.7 b VERTICAL SCANNING

FIG.8

COMPOSITE IMAGE

ENVIRONMENT MONITOR

TECHNICAL FIELD

The present invention relates to an environment monitoring technology according to an infrared sensing system and more particularly to a technology useful for a chopping mechanism of an environment monitor, separating an incident infrared radiation into a plurality of wavelength bands, sensing the intensity of an infrared radiation of each separated wavelength band by a sensor, and enabling detection of the temperature and determining whether a disastrous fire occurs or not, in a monitored area, on the basis of the outputs of the sensors.

BACKGROUND ART

As a fire sensing method or an apparatus, for automatically sensing the occurrence of a disastrous fire, for example, an infrared sensing system for sensing infrared radiation from a flame has been known up to this time. In a fire sensing apparatus of such an infrared sensing system, a chopper for periodically chopping an incident infrared radiation is provided in front of an infrared sensor. However, a conventional general chopper entails a drawback in that when there are some temperature differences between the chopper and the background thereof, the sensor produces an output in response to the differences even if there is no heating source in the visual field of the sensor. The present applicant has filed an application (Japanese Patent Application Publication (Laid-Open) No. Tokukai-hei 4-299797) for an invention relating to a chopper in that when there are some temperature differences between the chopper and the background thereof, the sensor does not sense and provides no output.

Although the fire sensing apparatus using a chopper which is described in the above prior application by the present applicant can detect the presence or absence of a disastrous fire when monitoring a relatively wide visual field, it cannot recognize where the disastrous fire occurs in the visual field. When a plurality of disastrous fires occur, it may not to recognize the presence or absence of the disastrous fires due to the mutually interfering inputs to the sensor. For example, when there are two heating sources A and B, and infrared radiation from the heating source A and infrared radiation from the heating source B enter the sensor, and if the directions of these infrared radiations from the heating sources are different from each other, there is a possibility that the timing of the infrared radiation interrupted by the chopper will be different from each other, in particular, there is a possibility that when the infrared radiation from the heating source A is interrupted by the chopper, the infrared radiation from the heating source B reaches to the sensor through a slit (an opening) of the chopper. In this case, the infrared radiation which reaches to the sensor leads to the same result as the infrared radiation not being interrupted by the chopper. Consequently, there is a possibility that the sensor concludes that there is no heating source, although there are two heating sources.

The present invention was developed in view of the above-described problems. An object of the present invention is to provide a technology for sensing a disastrous fire which not only can recognize where the disastrous fire occurs in a wide visual field monitored, but also the separate the visual field.

Another object of the present invention is to be able to detect the presence or absence of a disastrous fire and the occurrence position thereof by changing only a chopper while using a signal processor and a judgment circuit, in a conventional fire sensing apparatus.

DISCLOSURE OF THE INVENTION

In order to achieve the above-described objects, in the present invention, a disc having a plurality of radial slits each of which have approximately the same width as a diameter of a photoreceptor of the sensor, and a rotary chopper, are arranged to coaxially rotate. When one of the slits faces a sensor, the disc and the chopper are rotated at a rotational speed so that the incident infrared radiation into the sensor is chopped 2–16 times, preferably 2–8 times, by the chopper. At least two sets of sensors are present in the invention, which comprises a plurality of sensors for sensing infrared radiation at different wavelength bands relative to one another. The sensors are arranged behind the chopper and the disc along a radial direction centered at the rotational axis of the chopper.

In the above case, preferably, the number of openings of the chopper is twice the number of the sets of the arranged sensors or an integral multiples thereof. The width of the opening of the chopper is preferably not larger than one-half of the pitch of the openings. It is preferable to use the frequency of the chopper of 1–100 Hz. In the use of pyroelectric infrared sensors, the frequency of the chopper of 1 Hz is preferred, and in the use of another type of sensors, that of 1–100 Hz is preferred.

Preferably, the number of slits formed in the disc is twice the number of the sets of the arranged sensors or an integral multiples thereof.

The rotational directions of the chopper and the disc may be selected at will. Therefore, the chopper and the disc may be rotated in the same direction or in different directions relative to each other.

Although the chopper and the disc may be arranged in front of, or in back of each other, preferably, the chopper is arranged in front of the disc.

According to the above-described means, for example, when the two sets of sensor groups are arranged at a right angle to each other, it is possible to obtain detection signals by scanning a monitored area in a X-direction and a Y-direction. Consequently, it is possible to easily recognize the position where the disastrous fire occurs in the visual field and to detect positions of disastrous fires in distinction from one another even if those occur at a plurality of positions. When the number of openings of the chopper and the number of slits formed in the disc is respectively twice the number of the sets of the arranged sensors or an integral multiples thereof, because it can make the outputs of the sensor groups in a common phase, subsequent processing of signals can be simplified.

Further, by arranging the chopper in front of the disc, it is possible to reduce decision errors caused by the temperature difference between these members.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

THE BEST MODE FOR PERFORMING THE INVENTION

Preferred embodiments of the present invention will be described by referring to the drawings, as follows.

Figure 1:
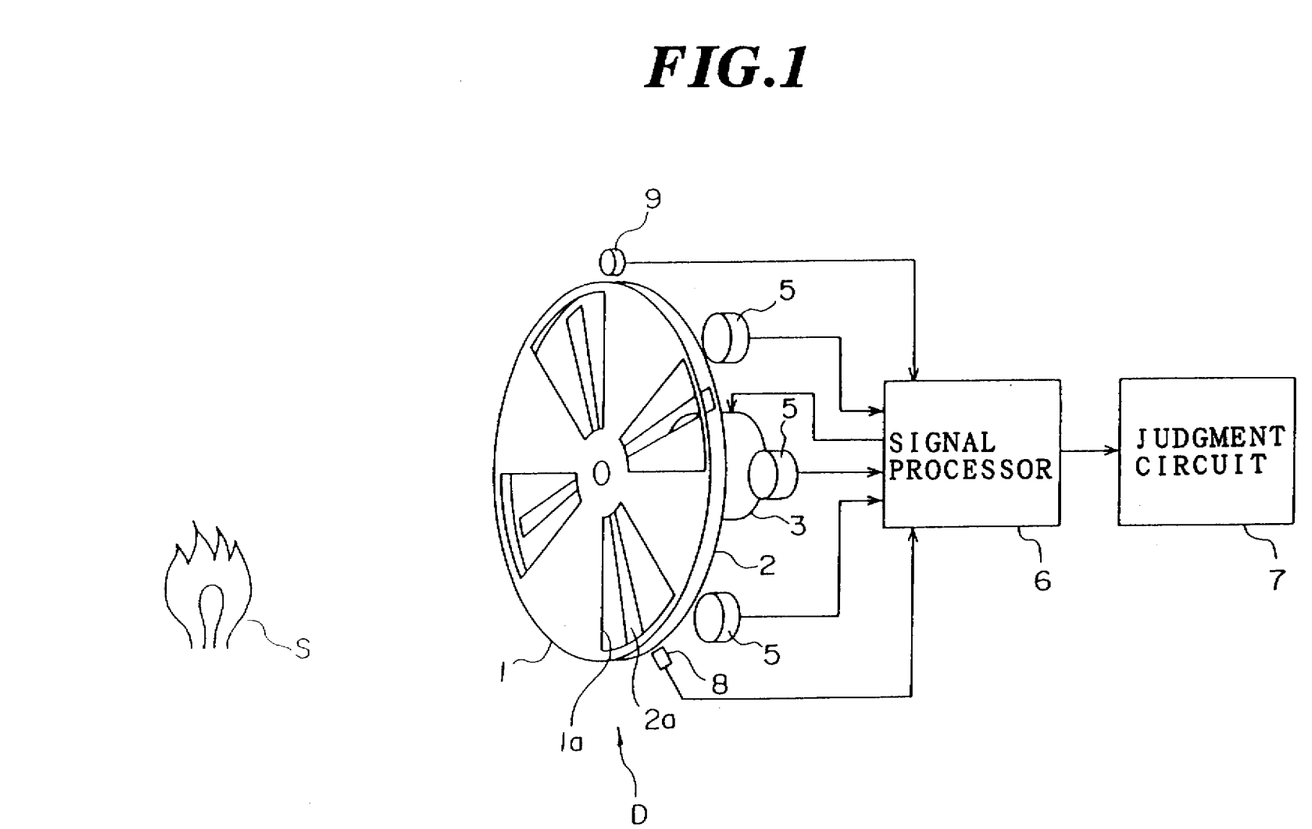
FIG. 1 is a schematic construction view showing a fundamental arrangement of an environment monitoring apparatus to which the present invention is applied.

FIG. 1 is a fundamental construction view of an environment monitoring apparatus to which the present invention is applied. An infrared radiation sensing unit D receives infrared radiation which is radiated from an infrared source S such as a flame or the like. The infrared radiation sensing unit D separates the infrared radiation into a plurality of wavelength bands and senses the infrared intensity of each of the wavelength bands.

The infrared radiation sensing unit D comprises; a rotational chopper 1 for periodically chopping the incident infrared radiation, a disc 2 having slits 2a which are radially formed therein, a motor 3 for rotating the chopper and the disc at respective predetermined speeds, a group of infrared sensors 5 arranged at the rear of the chopper 1 and the disc 2, a signal processor 6 for processing output signals of the group of infrared sensors 5, and a judgment circuit 7 for performing a judgment of the presence or absence of a disastrous fire on the basis of the outputs of the signal processor 6.

Figure 2:
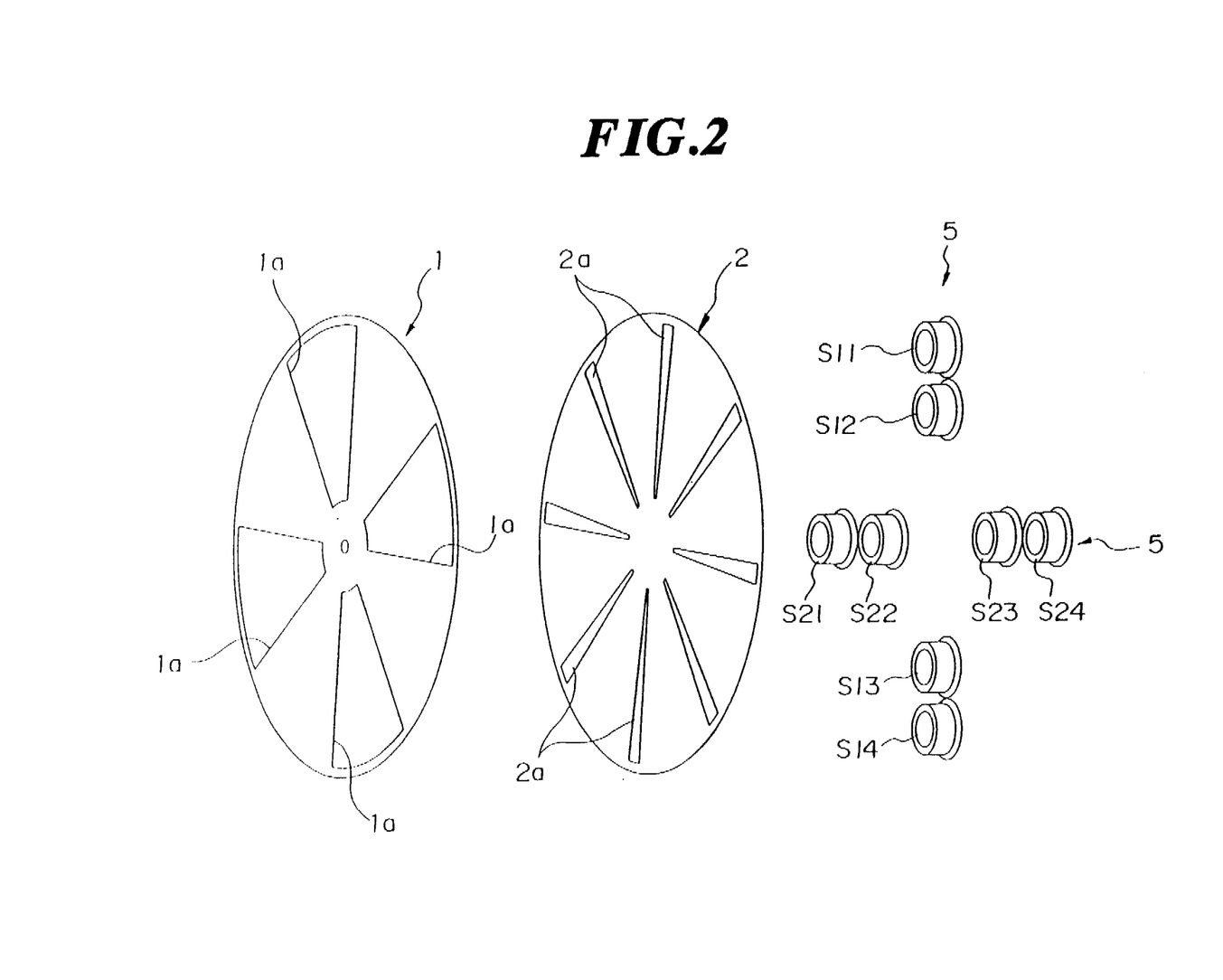
FIG. 2 is an explanation view showing an example of arrangement of a group 5 of infrared sensors in the present invention.

The above-described group of infrared sensors 5 comprises two sets of sensors, each set of which includes four pyroelectric infrared sensors for sensing infrared radiations of different wavelength bands to one another, although it is not limited to this. Each infrared sensor has a built-in band-pass filter which allows a predetermined wavelength band of infrared radiation to pass. An example of arrangement for the above-described group of infrared sensors 5 is shown in FIG. 2. In this figure, reference numerals S11–S14 denote a set of infrared sensor group, and reference numerals S21–S24 denote another set of infrared sensor group. The infrared sensors in each set are arranged behind the disc 2, on a straight line along a radial direction centered at the rotational axis of the disc 2. The sets of infrared sensor groups S11–S14 and S21–S24 are arranged at aright angle to each other, that is, so that the whole set has a cross-shape.

The four infrared sensors of each set can sense infrared radiation of four wavelength bands, i.e., (1) a wavelength band including a wavelength in the range of 2.8–3.2 $\mu$m, (2) a wavelength band including a wavelength in the range of 4.2–4.6 $\mu$m, (3) a wavelength band including a wavelength in the range of 4.6–5.4 $\mu$m, (4) a wavelength band including a wavelength in the range of 8.0–9.0 $\mu$m, respectively, although it is not limited to this. For example, the wavelength bands which are sensed through the four sensors are set to have (1) a central wavelength of 3 $\mu$m and a half band width of 0.4 $\mu$m, (2) a central wavelength of 4.4 $\mu$m and a half band width of 0.4 $\mu$m, (3) a central wavelength of 5.5 $\mu$m and a half band width of 0.8 $\mu$m, and (4) a central wavelength of 8.5 $\mu$m and a half band width of 1.0 $\mu$m, respectively. One of these wavelength bands includes the wavelength band (i.e., 4.3 $\mu$m) of $CO_2$-molecular resonance radiation, which corresponds to the wavelength band of the above-listed (2) wavelength bond. The number of the wavelength bands to be sensed is not limited to 4 which is shown in the above description. It may be 3-divided wavelength bands also. Up to 5–6 divided wavelength bands may be sufficiently practical. The infrared sensor having the wavelength band to be sensed, of the above-listed (4), may be also a sensor sensing infrared radiation with a wavelength band of not less than 6.5 $\mu$m or a sensor sensing infrared radiation with a wavelength band of not less than 8 $\mu$m.

The infrared sensor may be not only a pyroelectric infrared sensor but also a semiconductor infrared sensor or the like.

The pyroelectric infrared sensor has an arrangement in which electrodes are formed on the top surface and back surface of a thin plate made of a pyroelectric material such as lithium tantalate or $Pb(Zr_xTi_{1-y})O_3$ by vacuum deposition or the like.

A pulse motor, a direct current motor or the like are suitable for rotational driving of the chopper 1. The direct current motor requires a rotational speed sensor such as a photointerrupter in order to sense a rotational speed of the chopper 1 or the disc 2. The pulse motor requires no photointerrupter for detecting a rotational speed of the chopper since such a rotational speed can be provided through a driving circuit. In this embodiment, a direct current motor is used, and a speed-reduction gear 4 for reducing a rotational speed of the motor and for rotating the chopper 1 and the disc 2 by only one motor, is provided.

Figure 3:
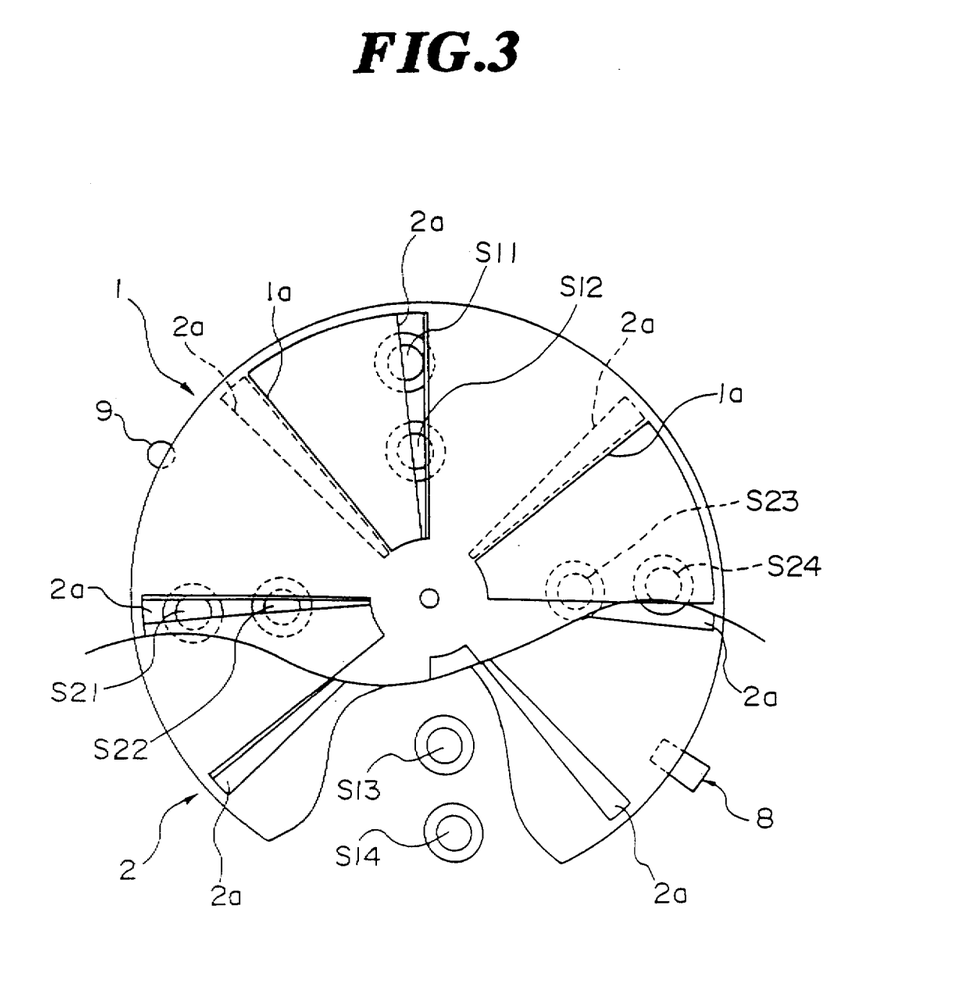
FIG. 3 is a front explanation view showing the detail of the chopper and the disc and showing the relationship between them and the group of infrared sensors.
Figure 4:
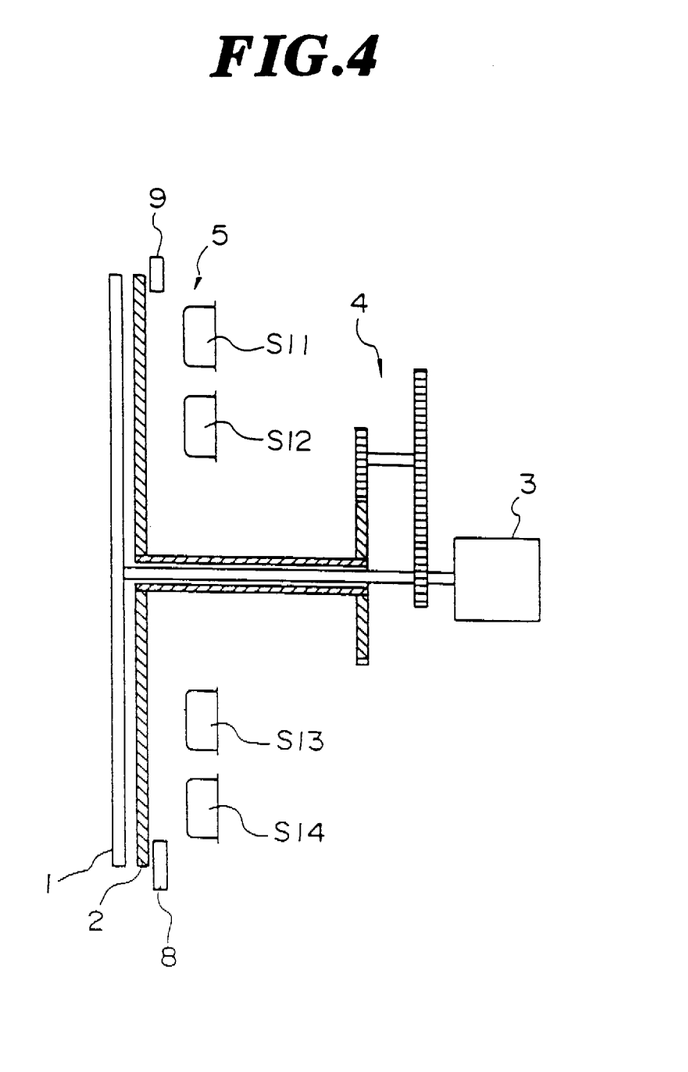
FIG. 4 is a side explanation view showing the relationship between the chopper, the disc and the group of infrared sensors and showing a construction example of a speed-reduction gear.

The detail of the chopper 1 and the disc 2, the relationship between them and the group of infrared sensors 5, and a construction example of the speed-reduction gear 4 are shown in FIGS. 3 and 4. In these Figures, the reference numeral 8 denotes a photointerrupter for sensing the position of slits of the disc (or the chopper), and the reference numeral 9 denotes a temperature sensor for sensing the temperature in the vicinity of the chopper.

In this embodiment, the chopper 1 is provided with four (twice the number of sets of the infrared sensors) openings 1a at equal angles (90°). The width angle of each opening 1a is 45°. The disc 2 is provided with eight (four times the number of sets of the infrared sensors) slits 2a at equal angles of 45°. The width of each slit 2a is set to be a little larger (about 5.6°) than the diameter of a photoreceptor. Since the resolution of the sensor decreases when the width of each slit 2a is too small, the width of each slit 2a is preferably set to a similar extent to the diameter of the photoreceptor (a width of 1–2 times the diameter of the photoreceptor). Hereinafter, the width of each slit 2a means one of the slit facing the nearest sensor to the center of the disc in the arranged sensors. The diameter of the photoreceptor is not one of the sensor in appearance shown in Figures and is one of just the photoreceptor of the sensor. The sensor shown in Figures is packaged and has a photo-receptive element arranged therein.

The rotational speed of the motor 3 is controlled so that the frequency of the chopper 1 is 1 Hz. The reduction ratio of the speed-reduction gear 4 is set so that the chopper 1 chops an incident infrared radiation 2–16 times, preferably 2–8 times, while one of the slits 2a is facing the sensor. That is, when the rotational direction thereof is the same as that of the chopper 1, the reduction ratio is 1/32 to 1/256. The rotational directions of the chopper and the disc can be selected at will, and therefore the chopper and the disc can be rotated in opposite directions to each other. Too much chopping (number of times of intermission) by the chopper 1 is not preferable because of time consumption. In order to obtain stable signals from the sensor with a good repeatability, the number of times of chopping by the chopper 1 which is not less than 2 is required.

The signals sensed by the photointerrupter 8 are supplied to the signal processor 6. The signal processor 6 operates the positions of the slits of the disc 2 or the rotational speed of the chopper 1, and outputs a control signal to the motor 3 so as to give a predetermined rotational speed to the motor.

The output signals of the above-described infrared sensors S11–S14 and S21–S24 are also input into the signal processor 6, and processing, e.g., A/D conversion, synchronous detection and the like, are performed in this place. The judgment circuit 7 monitors the temperature of the infrared source, a heating area, and the change of them with time. The judgment circuit judges on the basis of the operation results whether the infrared source is a disastrous fire or not; and outputs a driving signal for an alarm or a monitor when a judgment of occurrence of a disastrous fire has been detected.

A part of the function of the above signal processor 6 and the function of the judgment circuit 7 may be also carried out by using a microcomputer.

Figure 5:
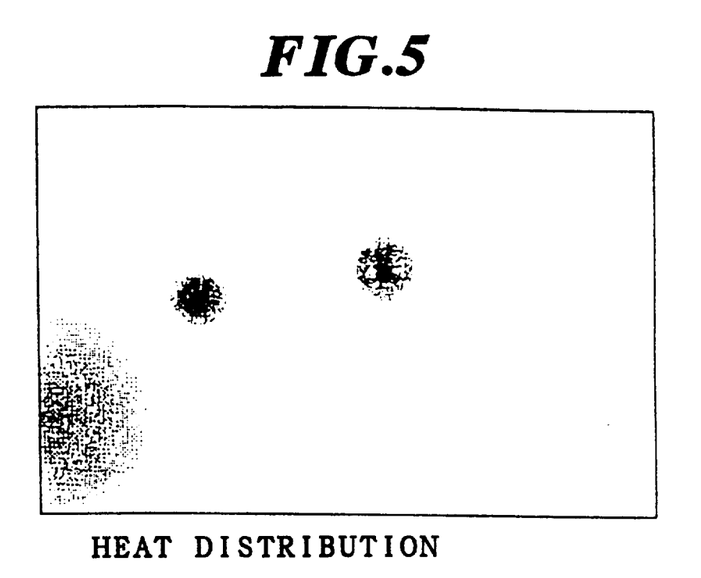
FIG. 5 is for showing how to recognize the fire occurring positions in the environment monitoring apparatus according to the present invention, in particular, a view showing positions of heaters in a monitored area.
Figure 6:
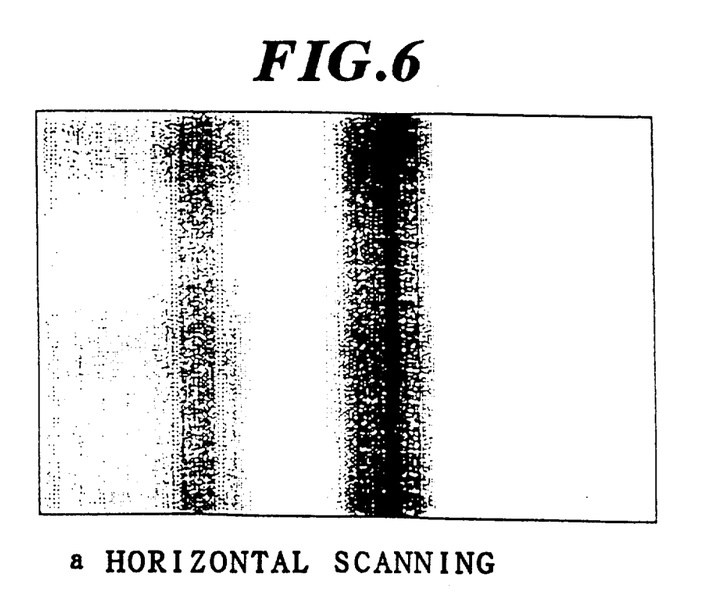
FIG. 6 is a horizontal scanned picture view representing the intensity of infrared radiation on the basis of the outputs of the group of infrared sensors S11 to S14 by light and shade in two dimensions.

In the above-described embodiment, since the two sets of infrared sensor groups S11–S14 and S21–S24 are arranged at a right angle to each other so that the whole set has a cross-shape, centered at the rotational axis of the disc 2, and when there is a heat distribution as shown in FIG. 5 in a monitored area, (in the visual field of the sensors), the intensity of infrared radiation on the basis of the outputs of one group of infrared sensors S11 to S14 can be represented by light and dark areas in two dimensions by using picture signals horizontally scanned in the visual field, as shown in FIG. 6.

Figure 7:
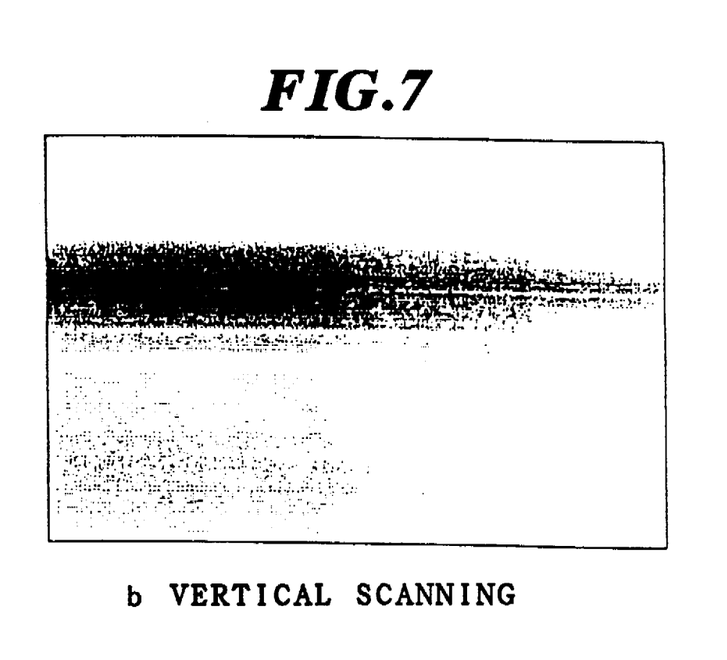
FIG. 7 is a vertical scanned picture view representing the intensity of infrared radiation on the basis of the outputs of the group of infrared sensors S21 to S24 by light and shade in two dimensions.

The intensity of infrared radiation on the basis of the outputs of the other group of infrared sensors S21 to S24 can be represented by light and dark areas in two dimensions by using picture signals vertically scanned in the visual field, as shown in FIG. 7.

Figure 8:
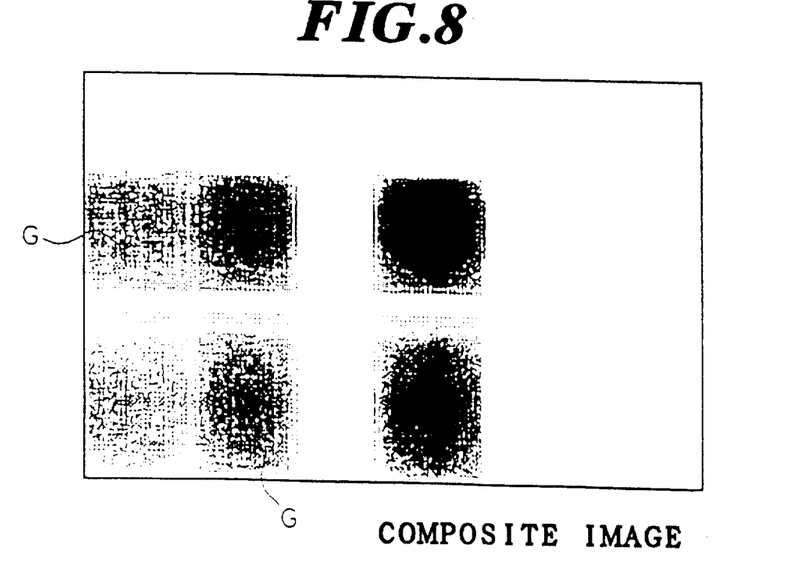
FIG. 8 is a composite chart representing a picture which is composed of the horizontal scanned picture shown in FIG. 6 and the vertical scanned picture view shown in FIG. 7.

Accordingly, the picture shown in FIG. 8 can be obtained by composing the above pictures. In FIG. 8, the reference character G denotes a ghost image, and by overlapping this and a picture obtained from a monitoring camera or the like, the position of the infrared source, i.e., the heater, can be specified.

Although two sets of infrared sensors group are arranged at a right angle to each other in the above-described embodiment, three sets of infrared sensors group may be prepared so that the infrared sensors in each set are arranged on a straight line and these three sets are arranged at 60 degrees. According to this construction, since picture signals scanned in three directions can be obtained, it is possible to easily specify the position of the infrared source.

The size of the heating portion is calculated after roughly seizing the size from the waveform of scanned output signals of the sensors. When the size of a heating portion is out of the viewing range as seen through the slit, it is possible to know the heating area from the moving range of the slit to while scanning over the heating portion. When the size of a heating portion is smaller than the viewing range as seen through the slit, the heating area thereof can be found by the following calculations.

In an actual disastrous fire, a phenomenon in which a heater with a low temperature becomes one with a higher temperature gradually and the heating area thereof increases the disastrous fire starts from a smoking condition without a flame to a fire with a flame. It is preferable to monitor the temperature of the heater in a wide range from a lower temperature to a higher temperature. Therefore, in this embodiment, the presence or absence of flame is monitored on the basis of the output of the sensor for sensing an infrared radiation of the wavelength band described in the above (2) wavelength band. The higher temperature range is monitored on the basis of the outputs of the sensors for sensing an infrared radiation of the wavelength bands described in the above (1) and (3) wavelength bands; and the lower temperature range is monitored on the basis of the outputs of the sensors for sensing an infrared radiation of the wavelength bands described in the above (4) and (3) wavelength bands.

Where the wavelength bands to be detected are $\lambda 1, \lambda 2, \ldots \lambda n$ (n is an integer not less than 2) and detection outputs of wavelength bands $\lambda 1, \lambda 2, \ldots \lambda n$ detected in the infrared radiation sensing unit D are $V1, V2, \ldots Vn$, respectively, the temperature T is represented by the following approximate equation [Math 1]:

$$T = C2 \frac{\lambda 1 - \lambda 2}{\lambda 1 \cdot \lambda 2} \times \frac{1}{\ln\left\{ \left(\frac{a2 \cdot V2}{a1 \cdot V1}\right)\left(\frac{\lambda 2}{\lambda 1}\right)^5 \right\}} \quad \text{[Math 1]}$$

wherein C2 is a constant determined by the equation C2=hc/k, where h: Plank constant; c: light velocity; k is Boltzmann's constant; and a1, a2, ... an (n is an integer not less than 2) are coefficients for compensating variation of sensitivity of each sensor, and the variation of the amplification degree of the circuits and the like. When the intensity of radiation which is radiated to a half space from unit area of the heating portion is P, there is a relationship between the intensity P and the output value V of the sensor, as follows:

$$an \cdot Vn = Pn/(2\pi L^2)$$

wherein L is a distance between the sensor and the heater.

In a fire sensing using an infrared sensing process, although the wavelength band of the intrinsic radiation component which is peculiar to a flame is approximately constant and is not dependent on the size or quality of the flame, the amount of the intrinsic radiation component which is peculiar to the flame included in the whole radiation, is dependent on the size or quality of the flame. Radiation of a flame is divided into a radiation portion by a blackbody exposed to a flame and an intrinsic radiation portion peculiar to a flame, and is the sum of the blackbody radiation portion and the intrinsic radiation portion peculiar to the flame. The amount of intrinsic radiation component peculiar to the flame varies depending on the size of the flame. Although the wavelength band in which the intrinsic radiation peculiar to the flame is mainly one in the above-described (2) wavelength band, the intrinsic radiation peculiar to the flame presents itself in the wavelength band in the above-described (3) wavelength band also. It is considered that the radiation presenting itself in the wavelength band in the above-described (3) wavelength band is one from the moisture caused by burning.

Figure 9:
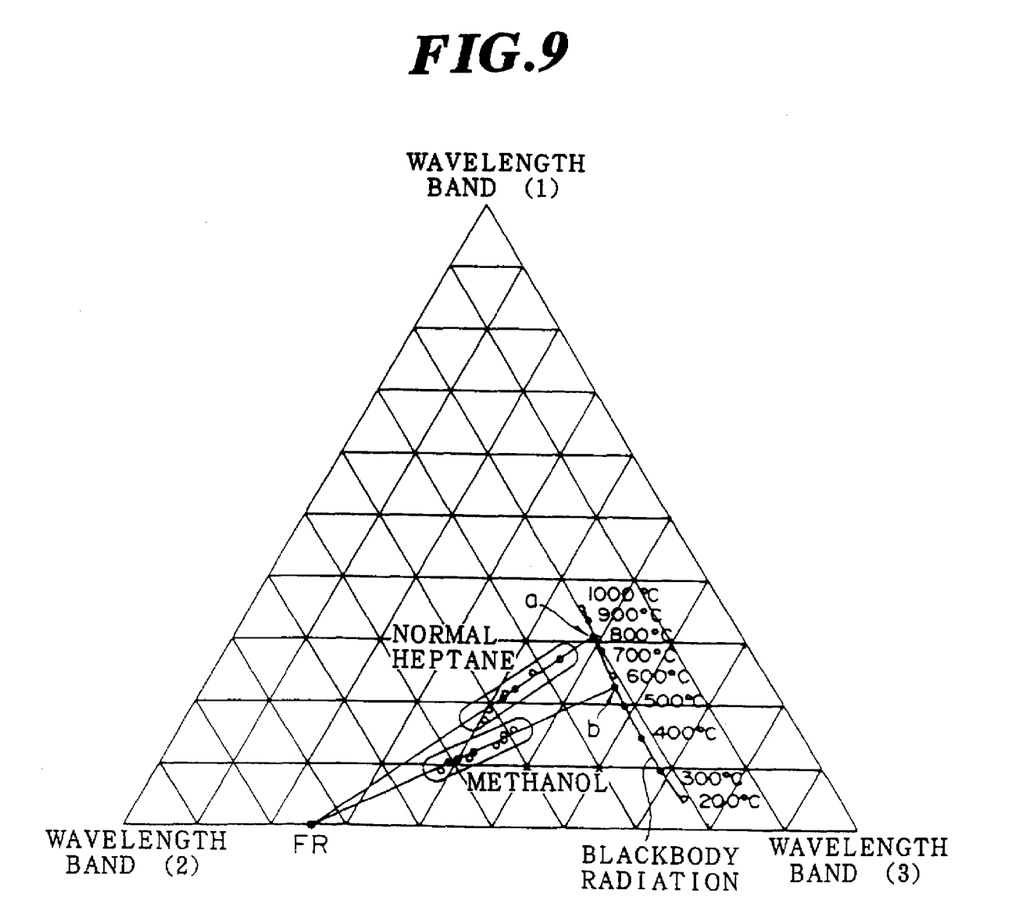
FIG. 9 is an explanation view representing ratios of outputs of the infrared sensors in wavelength bands, which was obtained through an experiment for sensing various heaters by using a fire sensing apparatus having a construction shown in FIG. 1.

FIG. 9 represents an example of ratios of the intensities of a plurality of infrared radiation bands including the intensity of infrared radiation which is in a $CO_2$-molecular resonance radiation band, and represents the ratios of the outputs of the sensors in wavelength bands, which was obtained through an experiment for sensing various heaters by using a fire sensing apparatus having a construction shown in FIG. 1.

The intrinsic radiation component peculiar to a flame has a component ratio at the point FR in FIG. 9 in the wavelength bands (2) and (3). The ratios of the outputs of the sensors due to burnings of various types of combustibles are on respective linear lines which pass through the point FR. That is, the radiation components peculiar to a flame in the wavelength bands (2) and (3) of any types of flames have a component ratio indicated at the point FR. When subtracting the intrinsic radiation components peculiar to the flame from the flame radiation, the rest is brought at a point on the line of the blackbody radiation, regardless of the size of flame.

Flame radiation is obtained by superimposing resonance radiation according to the vibration of molecules, e.g., $CO_2$, $H_2O$ and the like, which is produced by burning, upon a heat radiation according to solid particles, e.g., graphite and the like, which is also produced by burning. The radiation from solid particles is distributed in almost the whole flame, and is a radiation from a translucent body because of particles distributed in the gas. It can be considered that the emissivity (the ratio of the radiation intensity at a wavelength λ from an object at a temperature to the radiation intensity at a wavelength λ from the blackbody at a temperature) of this translucent body part is almost 1 when the flame is large.

The intrinsic radiation of a flame according to $CO_2$, $H_2O$ and the like, has a very high radiation efficiency and is one from the surface of the flame. Therefore, for example, radiation according to burning of normal heptane has a radiation component on a straight line which passes through the point "a" which indicates the heat radiation according to solid particles, e.g., graphite and the like, produced by burning, and through the point FR which indicates the intrinsic radiation of a flame according to $CO_2$, $H_2O$ and the like, in FIG. 9. Similarly, radiation according to burning of methanol has a radiation component on a straight line which passes through the point "b" and the point FR, in FIG. 9.

With respect to the temperature of a flame, the gas body which is an outer layer of the flame is the highest. Therefore, the temperature at which heat radiation is generated is often not the highest one in the flame. However, when the scale including the whole flame is considered, it is preferable to consider the radiation whole of the flame, that is, the heat radiation according to solid particles, e.g., graphite and the like, produced by burning, according to the above-described ideas, i.e., "Flame radiation is obtained by superimposing the heat radiation according to solid particles, e.g., graphite and the like, produced by burning. The radiation produced by solid particles is distributed in almost the whole of flame, and is a radiation according to a translucent body because of the particles distributed in a gas."

Next, a computing process producing the temperature will be examined, as follows. The point FR which is the origin for the straight lines showing the characteristics of the respective flames of normal hepthane and methanol, has a component ratio of "the wavelength band (2): the wavelength band (3)=74:26." Therefore, a phase diagram having vertices at the point FR and the wavelength band (1) and the wavelength band (2) may be considered.

According to the ratio, the component of heat radiation in the flame can be separated by subtracting the intrinsic radiation peculiar to the flame, which is represented by the point FR, from the flame radiation component which was practically detected. This on the curve of the blackbody radiation in this Figure. By carrying out such a calculation, it is possible to produce the temperature in accordance with the equation [Math 1], from the ratios of the wavelength band (1) and the wavelength band (2), like the computation of the temperature of an ordinary black body radiation. Therefore, it can be produced by subtracting the flame radiation component from the wavelength band (3).

A concrete computation example will be shown, as follows. In the computation example, approximate computations are performed in order to simplify computation. According to FIG. 9 and the like, it is understood that with respect to the characteristics of the curve of the blackbody radiation, the ratio of the wavelength band (2) has a small change according to the temperature and is about 20% of the sum total of the three wavelength bands. Therefore, an approximate radiation component of the blackbody can be determined by subtracting the intrinsic component peculiar to flame so that the ratio of the wavelength band (2) is about 20% of the sum total of the three wavelength bands, i.e., the wavelength band (1), the wavelength band (2), and the wavelength band (3). It is possible to reduce an error by setting the standard of ratio of the subtracted wavelength band (2) to the blackbody radiation at 700° C.–1000° C.

In this case, the error of the computation result for the temperature is a maximum of about 20%. When setting the standard to the blackbody radiation at not more than 500° C., the error will become large in a high temperature range.

Next, computation steps thereof will be described, as follows. First, prior to computing the ratios of the intensities of a plurality of infrared radiation bands including at least the intensity of infrared radiation which is in a $CO_2$-molecular resonance radiation band, the intrinsic component peculiar to flame is subtracted. For example, where output values of the sensors for components of three wavelength bands (1)–(3) are V1, V2, and V3, respectively, the value to be subtracted as the component peculiar to a flame is Vx which is the total sum of the components peculiar to flame for the wavelength bands (2) and (3) which have ratios of Vf2 and Vf3, respectively. The ratio of the wavelength band (2) in the blackbody radiation used as the standard is R2, which is determined by the following equation.

$$\frac{V2 - Vx \cdot Vf2}{V1 + (V2 - Vx \cdot Vf2) + (V3 - Vx \cdot Vf3)} = R2 \quad \text{[Math 2]}$$

Therefore, $$Vx = \frac{V2 - R2 \cdot (V1 + V2 + V3)}{Vf2 - Vf3} \quad \text{[Math 3]}$$

Using the value Vx, the radiation component of flame may be subtracted from the wavelength bands (2) and (3). The temperature T of the flame is produced by substituting the value of the wavelength band (1) and the revised value V3' of the wavelength band (3) into the equation [Math 1]. On the basis of the produced temperature, the radiation intensity per unit area of the wavelength bands (2) and (3) is produced by computation. Where the radiation intensities per unit area which were produced by applying Plank's law of radiation for the respective radiation bands are P2' and P3', the computed values of the outputs of the sensors are represented as follows:

$$V2''=P2'/(2\pi L^2 \cdot a2), \text{ and}$$

$$V3''=P3'/(2\pi L^2 \cdot a3).$$

Accordingly, the area S and the $CO_2$ ratio R are represented as follows:

$$S=V3'/V3''=V3'2\pi L^2 \cdot a3/P3', \text{ and}$$

$$R=V2'/V2''=V2' \cdot 2\pi L^2 \cdot a2/P2'.$$

The temperature and the area, of an infrared source are produced by the above-described steps. There is a good chance that the infrared source having a small size, i.e., a small area, is not a disastrous fire even with a high temperature. On the other hand, the infrared source having a large area could be a disastrous fire even with a low temperature. As described above, the most important matter is the amount of heat which is supplied to the surroundings from the heat source, in considering heat sources in all conditions. When the amount of heat supplied to the surroundings is large, the danger of fire spreading increases and the expansion speed thereof also comes to be large. The amount of heat supplied to the surroundings depends on the amount of radiation energy of the heat source.

Therefore, it is considered that the amount of radiation energy represents the scale of the heat source. The amount of radiation energy W of the heat source having a temperature T and an area s is represented in accordance with Stefan-Boltzmann's law, as follow:

$$W=T^4\sigma \cdot s$$

wherein $\sigma$ is Stefan-Boltzmann constant and $\sigma=5.673\times10^{-12}$ (W/cm$^2\cdot$deg$^4$). Therefore, it is possible to know the scale of the heat source by using the temperature and the area of the infrared source.

In the embodiment, when the amount of radiation energy which was produced by the above steps exceeds the amount of heat of a dangerous state in the space of the object, an alarm is given. In a general disastrous fire, it is said that the amount of heat of the heat source being 5 kW–20 kW makes a dangerous state, a state in which those present in the space will feel to be in danger. This value may be changed, of course, depending on the size, use and the like, of the space. Preferably, one or more divisions are provided in a range of value less than the amount of heat of the above dangerous state so that distinguishable respective alarms indicating classified several steps of danger are given when the amount of radiation energy exceeds a corresponding division. Accordingly, it is possible to give a preliminary alarm from early stages of a disastrous fire, and thereby it is possible not only to detect a disastrous fire with a higher precision but also to easily cope with the situation in an early stage.

Further, it is possible to precisely know the change of the condition of a disastrous fire by observing an increase of the amount of radiation energy. That is, when the amount of radiation energy is large and tends to increase, there is a large possibility of occurrence of a disastrous fire. When the amount of radiation energy is large and there is little change thereof, there is a large possibility of no disastrous fire being present and only useful heating or the like being present. Therefore, it is possible to detect a disastrous fire with a higher precision from an early stage by giving an alarm on the basis of the ratio of increase of the amount of radiation energy.

The ratio of increase of the amount of radiation energy is produced on the basis of the rate of change of the computed amount of radiation energy for a predetermined time. For this purpose, a process comprising the steps of, time-sequentially memorizing the computed values of radiation energy for a predetermined time, performing a high cut-off filter treatment such as moving average or the like to the time-sequential values, and thereafter comparing two values of the radiation energy which are separated to each other for a predetermined time; a process in which a tendency of changing is produced by the least square on the basis of the time-sequential values which are memorized for a predetermined time; or the like are used. Preferably, the memory time in computation of the ratio of increase is not less than 10 seconds and is not more than 3 minutes in order to avoid an alarm delay.

The standard for judgment of a disastrous fire includes a case of a ratio of increase of the amount of radiation energy exceeding a predetermined value, and a case of one or more predetermined divisions of several steps being provided. The process includes a case of calculating a ratio of increase of the amount of radiation energy being not less than a constant proportion of the amount of radiation energy of the heating source, where the ratio of increase thereof is divided in one or more predetermined classified several steps of proportions of the amount of radiation energy of the heating source, and the like. These cases are selected according to requirements of the space and the like. Generally, 1–5 divisions are preferably provided. The alarm includes one used when the heating source has been judged to be a disastrous fire, in the cases of the ratio of increase of the amount of radiation energy exceeding the above standard or corresponding to any of the divisions; and one in which an alarm in one of the divisions, e.g., including 6 steps, which is set according to the amount of radiation energy for each step of the ratio of increase, is transferred to an alarm in a higher rank. The alarm stages are also suitably selected according to the specification of the space.

(Concrete Example)

An environment monitoring apparatus applying the above embodiment was installed in a plant which was provided with a group of pipes for passing a fluid having a high temperature (300°–500° C.) therethrough and a pump for moving the fluid, in order to conduct a test for sensing the temperature distribution of each portion. For a comparison, a conventional thermoviewer of infrared sensing system was also installed at the same position, in order to conduct a test for sensing the temperature distribution of each portion at the same time. In these tests, a place in which a passage was provided at the center thereof and a plurality of vertical pipes were arranged at both sides of the passage, was selected and the apparatus was disposed at the center of the passage with a visual field looking out from a side of the passage to an another side.

Figure 10:
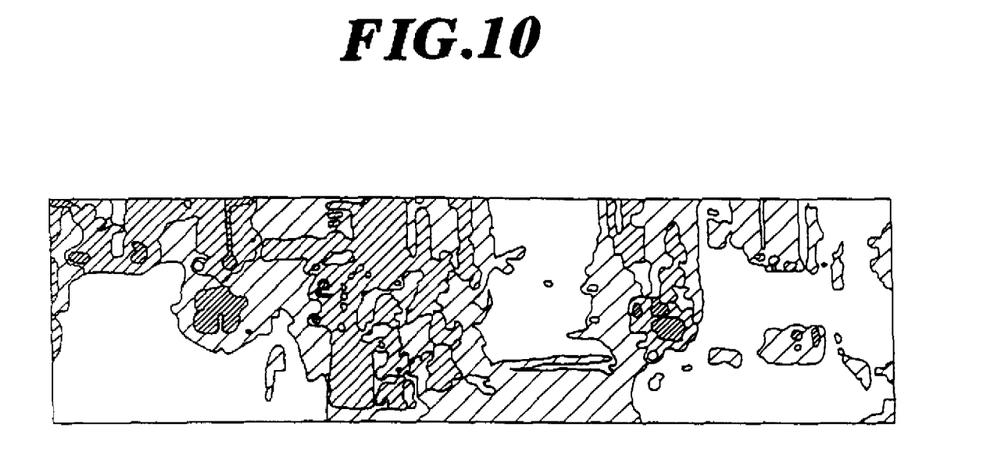
FIG. 10 is a view showing a temperature distribution picture which was observed by using a conventional thermoviewer.
Figure 11:
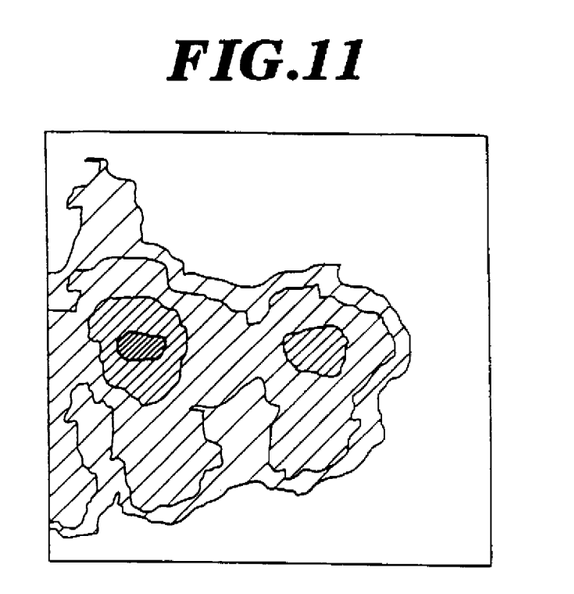
FIG. 11 is a view representing the intensity distribution of infrared radiation by using contour lines and light and shade in two dimensions, on the basis of the outputs of the sensor in the environment monitoring apparatus of the present invention.
Figure 12:
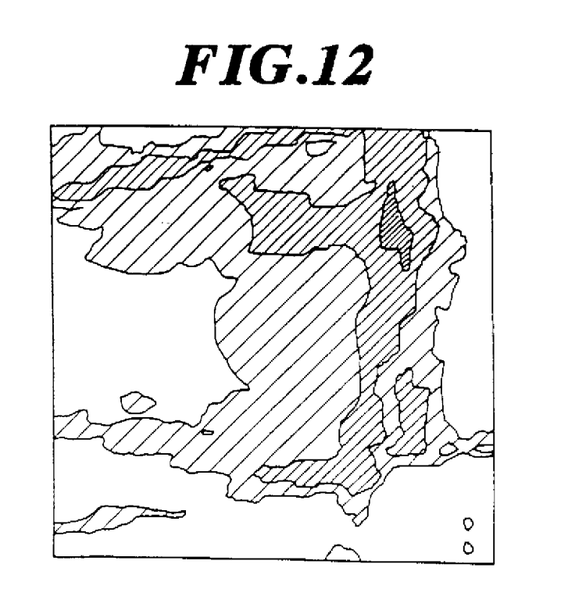
FIG. 12 is a view representing the temperature distribution by using contour lines and light and shade in two dimensions, wherein the temperature of each portion is calculated by the method of the above-described embodiment on the basis of the outputs of the sensors which sense the 5.5 $\mu$m and 8.5 $\mu$m wavelengths, in the sensors of the environment monitoring apparatus of the present invention.

FIG. 10 shows a temperature distribution picture which was observed by using a conventional thermoviewer. FIG. 11 represents the intensity distribution of infrared radiation by using contour lines and light and shade in two dimensions, on the basis of the outputs of the sensor in the environment monitoring apparatus of the present invention. On the other hand, FIG. 12 represents the temperature distribution by using contour lines and light and shade in two dimensions, wherein the temperature of each portion is calculated by the method of the above-described embodiment on the basis of the outputs of the sensors which sense the 5.5 $\mu$m and 8.5 $\mu$m wavelengths, in the sensors of the environment monitoring apparatus of the present invention. In FIGS. 10–12, as the hatching portion is darker (the pitch of hatching portion is smaller), the higher the temperature is.

It was ascertained that the two high temperature portions shown in the vicinity of the center of each of FIGS. 10 and 11 were the pumps in the plant. It is understood that the environment monitoring apparatus according to the invention provides an intensity distribution of infrared radiation similar to that obtained by the conventional thermoviewer because FIGS. 10 and 11 show the results thereof being very similar to each other. The width of visual field of the thermoviewer shown in FIG. 10 is different from that of the environment monitoring apparatus of the invention shown in FIG. 11. As a result of a search of the portion in the plant corresponding to the high temperature portion shown in FIG. 12, it was ascertained that the temperature of a portion of the pipe became very high although the area thereof was small. On the other hand, such a high temperature portion was not indicated in the picture of the intensity distribution of infrared radiation in FIG. 11. It is considered that the reason for this is that the area thereof is too small. From the test results, it is understood that the environment monitoring apparatus according to the invention is excellent in sensitivity of detecting a local high temperature. Therefore, it is clear that the apparatus according to the invention enables detection of an extraordinary temperature or a disastrous fire in an early stage.

As explained above, in the invention, a disc having a plurality of slits radially each of which have a width a little larger than the diameter of a photoreceptor of the sensor, and a rotary chopper, are arranged to coaxially rotate; when one of the slits faces a sensor, the disc and the chopper are rotated at a rotational speed so that the incident infrared radiation into the sensor is chopped 2–16 times by the chopper; and at least two sets of sensors, each set of which comprises a plurality of sensors for sensing infrared radiation of different wavelength bands to one another, the sensors being arranged behind the chopper and the disc along a radial direction centered at the rotational axis of the chopper, are provided. Accordingly, for example, when two sets of sensor groups are arranged at a right angle to each other, detection signals due to scanning a monitored area in a X-direction and a Y-direction respectively are obtained. Consequently, it is possible to easily recognize the position where the disastrous fire occurs in the visual field and to detect positions of disastrous fires in distinction from one another even if those occur at a plurality of positions.

Further, according to the invention, it is possible to sense the presence or absence of a disastrous fire and the occurrence position thereof by changing only a chopper while using a signal processor and a judgment circuit in a conventional fire sensing apparatus.

Because the number of openings of the chopper is twice the number of the sets of the arranged sensors or an integral multiples thereof, and the number of slits formed in the disc is twice the number of the sets of the arranged sensors or an integral multiples thereof, it can make the outputs of the sensor groups in a common phase, and subsequent processing of signals can be simplified.

Further, by arranging the chopper in front of the disc, it is possible to reduce decision errors caused by the temperature difference between these members.

Industrial Applicability

The present invention is useful for not only judgment for a disastrous fire but also for detection of an extraordinary temperature (for example, detection of a position at which an extraordinary temperature is produced in a plant).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An environment monitoring apparatus comprising:
    a plurality of sensors for separating incident infrared radiation into a plurality of wavelength bands, sensing the intensity of infrared radiation of each separated wavelength band, and enabling detecting of a temperature of a monitored area on the basis of outputs of the sensors;
    a disc having a plurality of radially aligned slits, each slit having approximately the same width as a diameter of a photoreceptor of a sensor and
    a rotary chopper being arranged to coaxially rotate with said disc, wherein when one of the slits faces a sensor, the disc and the chopper are rotated at a rotational speed so that the incident infrared radiation into each sensor is chopped 2 to 16 times by the chopper; and
    wherein said plurality of sensors are arranged in at least two sets, each set of which comprises a plurality of sensors for sensing infrared radiation at different wavelength bands relative to one another, the sensors being arranged behind the chopper and the disc along a radial direction centered at a rotational axis of the chopper.

2. The environment monitoring apparatus as claimed in claim 1, wherein a number of openings of the chopper is twice the number of the sets of the arranged sensors or an integral multiple thereof, and the number of slits formed in the disc is twice the number of the sets of the arranged sensors or an integral multiple thereof.

3. The environment monitoring apparatus as claimed in claim 1 or 2, wherein the chopper is arranged in front of the disc.

4. The environment monitoring apparatus of claim 2, wherein the openings of said chopper are substantially 45° in width, and the slits of said disc are substantially 5.6° in width.

5. The environment monitoring apparatus of claim 1, wherein the infrared sensors in each set are arranged behind said disc, the sets of sensors are arranged at right angles relative to each other to form a cross-shape to provide position information of said infrared radiation.

6. The environment monitoring apparatus of claim 1, further comprising a direct current motor for driving said chopper; and a photointerrupter for sensing the position of said slits to provide rotational speed sensing.

7. The environment monitoring apparatus of claim 1, further comprising a pulse motor for driving said chopper.

8. A method of monitoring an environment comprising the steps of:

arranging a plurality of sensors into at least two sets;

rotating a rotary chopper and a disc at a rotational speed whereby incident infrared radiation into each sensor is chopped 2 to 16 times;

separating incident infrared radiation into a plurality of wavelength bands;

sensing said infrared radiation by said sensors at different wavelength bands relative to each sensor;

sensing the intensity of said infrared radiation of each separated wavelength band by said sensors; and detecting temperature of said environment on the basis of outputs of said sensors.

9. The method of monitoring an environment according to claim 8, further comprising the step of:

forming a number of openings in said chopper whereby said number of openings is twice the number of sets of said sensors or an integral multiple thereof; and forming a number of slits in said disc whereby said number of slits is twice the number of sets of said sensors or an integral multiple thereof.

10. The method of monitoring an environment according to claim 8 or 9, further comprising the step of:

arranging the chopper in front of the disc.

\* \* \* \* \*

UNITED STATES PATENT AND TRADEMARK OFFICE
CERTIFICATE OF CORRECTION

PATENT NO. : 5,811,811
DATED : September 22, 1998
INVENTOR(S) : Kazunari NAYA It is certified that error appears in the above-identified patent and that said Letters Patent is hereby corrected as shown below:

On the title page, item (56) References Cited

U.S. PATENT DOCUMENTS

```
--2,920,485    01/1960    Derganc
  2,978,589    04/1961    Howell--
```

FOREIGN PATENT DOCUMENTS

```
--0 168679A2   01/1986    Europe
  0 419046A1   03/1991    Europe--
```

Signed and Sealed this

Second Day of February, 1999

Attest:

Attesting Officer

*Acting Commissioner of Patents and Trademarks*